(12) United States Patent
Sehr et al.

(10) Patent No.: US 12,377,874 B2
(45) Date of Patent: Aug. 5, 2025

(54) BROADCASTING VEHICLE CAPABILITIES TO PLANNING MODULES

(71) Applicant: GM Cruise Holdings LLC, San Francisco, CA (US)

(72) Inventors: Martin Sehr, Kensington, CA (US); Benjamin Tearle, San Francisco, CA (US); Shad Laws, Redwood City, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 221 days.

(21) Appl. No.: 18/149,501

(22) Filed: Jan. 3, 2023

(65) Prior Publication Data

US 2024/0217541 A1    Jul. 4, 2024

(51) Int. Cl.
*B60W 60/00*    (2020.01)
*B60W 40/02*    (2006.01)

(52) U.S. Cl.
CPC .......... *B60W 60/001* (2020.02); *B60W 40/02* (2013.01); *B60W 2555/20* (2020.02); *B60W 2556/45* (2020.02); *B60W 2756/10* (2020.02)

(58) Field of Classification Search
None
See application file for complete search history.

(56) References Cited

U.S. PATENT DOCUMENTS

| 8,849,494 B1* | 9/2014 | Herbach | G05D 1/0044 |
| | | | 701/24 |
| 8,996,224 B1* | 3/2015 | Herbach | B60W 60/0011 |
| | | | 701/25 |
| 2018/0101171 A1* | 4/2018 | Lemmer | H04L 67/12 |
| 2018/0204458 A1* | 7/2018 | Fairfield | G08G 1/096741 |
| 2019/0227569 A1* | 7/2019 | Weslosky | G07C 5/0825 |
| 2019/0294167 A1* | 9/2019 | Kutila | G08G 1/096827 |

* cited by examiner

*Primary Examiner* — Truc M Do
(74) *Attorney, Agent, or Firm* — CANTOR COLBURN LLP

(57) ABSTRACT

A vehicle capability broadcaster may receive information indicating a condition in an environment where an AV may operate. The vehicle capability broadcaster determines a first vehicle capability parameter and a second vehicle capability parameter based on the condition. The vehicle capability parameters may indicate capabilities of the AV for making different types of motions, e.g., limits of the AV making different motions. The vehicle capability broadcaster may transmit the first vehicle capability parameter to a first planning module and transmit the second vehicle capability parameter to a second planning module. The first planning module and the second planning module may plan one or more motions of the AV in the operation based on the vehicle capability parameters. The vehicle capability broadcaster may update a vehicle capability parameter and transmit the updated vehicle capability parameter to one of the planning modules after the one or more motions are planned.

20 Claims, 7 Drawing Sheets

US 12,377,874 B2

BROADCASTING VEHICLE CAPABILITIES TO PLANNING MODULES

TECHNICAL FIELD OF THE DISCLOSURE

The present disclosure relates generally to autonomous vehicles (AVs) and, more specifically, to broadcasting vehicle capabilities to planning modules.

BACKGROUND

An AV is a vehicle that is capable of sensing and navigating its environment with little or no user input. An AV may sense its environment using sensing devices such as Radio Detection and Ranging (RADAR), Light Detection and Ranging (LIDAR), image sensors, cameras, and the like. An AV system may also use information from a global positioning system (GPS), navigation systems, vehicle-to-vehicle communication, vehicle-to-infrastructure technology, and/or drive-by-wire systems to navigate the vehicle. As used herein, the phrase "AV" includes both fully autonomous and semi-autonomous vehicles.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
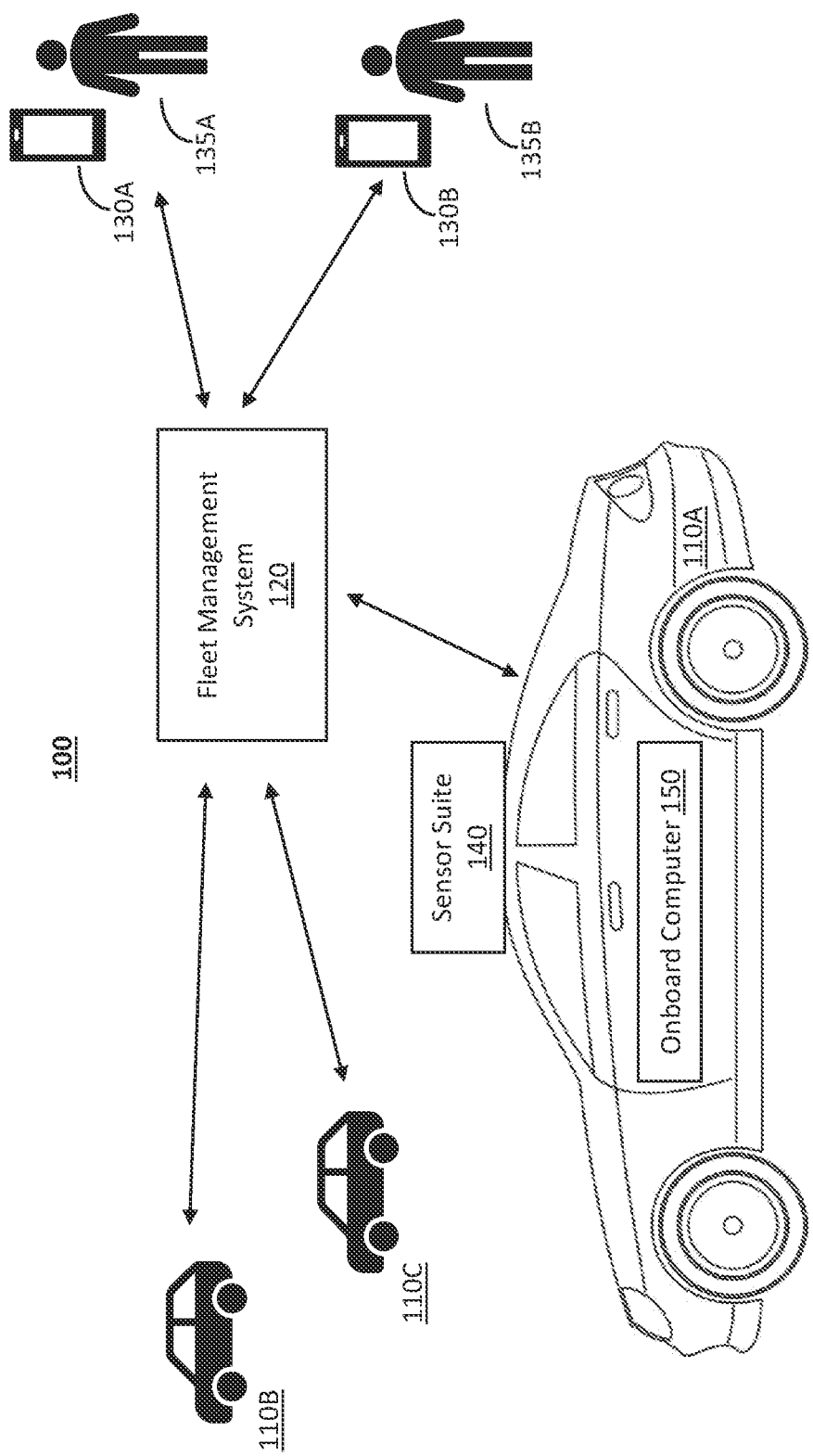
FIG. 1 illustrates a system including a fleet of AVs that can provide services to users.

The systems, methods and devices of this disclosure each have several innovative aspects, no single one of which is solely responsible for all of the desirable attributes disclosed herein. Details of one or more implementations of the subject matter described in this Specification are set forth in the description below and the accompanying drawings.

AVs can provide driverless ride services. A person can request an AV to pick him/her up from a location and drop him/her off at another location. With the autonomous driving features of the AV, the person does not have to drive during the ride and can be a passenger of the AV. The AV can navigate from the pick-up location to the drop-off location with no or little user input. Performance of AVs can be influenced by conditions in environments where the AVs operation. The operations, such as motions, of the AVs may need to be adapted to different environmental conditions.

Embodiments of the present disclosure provides a vehicle capability broadcasting platform that can determine motion capabilities of AVs based on environmental conditions and can broadcast the motion capabilities to planning modules that plan operations of the AVs.

An example of the vehicle capability broadcasting platform may include a vehicle capability broadcaster. The vehicle capability broadcaster may receive information indicating one or more conditions in an environment where an AV may operate ("environmental conditions"). The information may include sensor data or one or more perceptions of the AV, sensor data or one or more perceptions of another AV, data about the one or more environmental conditions from a system that is in communication with the AV, other information indicating the one or more environmental conditions, or some combination thereof. The vehicle capability broadcaster may determine one or more vehicle capability parameters based on the one or more environmental conditions. The vehicle capability parameters may indicate capabilities of the AV for making different types of motions, e.g., limits of the AV making different motions. Examples of vehicle capability parameters may include speed limit, acceleration limit, deceleration limit, jerk limit (e.g., a limit on acceleration rate or deceleration rate), curvature limit, snap limit, and so on. The vehicle capability broadcaster may broadcast the vehicle capability parameters to multiple planning modules of the AV, e.g., based on queries for vehicle capability parameters from the planning modules. Different planning modules may receive the same vehicle capability parameter or different vehicle capability parameters from the vehicle capability broadcaster.

The planning modules may plan one or more motions of the AV in the environment based on the vehicle capability parameters. In some embodiments, the planning modules may include a first planning module that generates a first plan based on one or more vehicle capability parameters and a second planning module that generates a second plan based on one or more vehicle capability parameters. The vehicle capability parameters used by the two planning modules may be in the same set of vehicle capability parameters, i.e., vehicle capability parameters generated based on the same environmental condition(s). The vehicle capability broadcaster may update at least one of the vehicle capability parameters, e.g., based on a change in environmental condition(s), and transmit the updated vehicle capability parameter to one of the planning modules. In some embodiments, even though the vehicle capability broadcaster updates a vehicle capability parameter before the second module generates the second plan, the vehicle capability broadcaster may select to transmit the updated vehicle capability parameter to the second planning module after all the planning modules finishes the planning of the AV's operation so that all the planning modules can use the same set of vehicle capability parameters to plan the AV's operation.

With the vehicle capability broadcasting platform in the present disclosure, vehicle capability parameters may be generated by a single source (e.g., the vehicle capability broadcaster) and be broadcasted to different planning modules from the single source. Also, the single source can control whether and when to update vehicle capability parameters with the planning modules. Thus, the vehicle capability broadcasting platform in the present disclosure can improve efficiency in controlling operations of AVs and ensure a non-interruptive planning process.

As will be appreciated by one skilled in the art, aspects of the present disclosure, in particular aspects of AV sensor calibration, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing perception system devices or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, or features are described below in connection with various example embodiments, these are merely examples used to simplify the present disclosure and are not intended to be limiting.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, or conditions, the phrase "between X and Y" represents a range that includes X and Y.

In addition, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or system. Also, the term "or" refers to an inclusive or and not to an exclusive or.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

The systems, methods and devices of this disclosure each have several innovative aspects, no single one of which is solely responsible for all of the desirable attributes disclosed herein. Details of one or more implementations of the subject matter described in this Specification are set forth in the description below and the accompanying drawings.

Example System Including AVs

FIG. 1 illustrates a system 100 including a fleet of AVs that can provide services to users, according to some embodiments of the present disclosure. The system 100 includes AVs 110A-110C (collectively referred to as "AVs 110" or "AV 110"), a fleet management system 120, and client devices 130A and 130B (collectively referred to as "client devices 130" or "client device 130"). The client devices 130A and 130B are associated with users 135A and 135B, respectively. The AV 110A includes a sensor suite 140 and an onboard computer 150. Even though not shown in FIG. 1, the AV 110B or 110C can also include a sensor suite 140 and an onboard computer 150. In other embodiments, the system 100 may include more, fewer, or different components. For example, the fleet of AVs 110 may include a different number of AVs 110 or a different number of client devices 130.

The fleet management system 120 manages the fleet of AVs 110. The fleet management system 120 may manage operations of the AVs 110. For instance, the fleet management system 120 may provide software ("AV software") to the fleet of AVs 110. The software, when executed by processors, may control operations of the AVs 110. The fleet management system 120 may provide different software to different AVs 110. The fleet management system 120 may also update software, e.g., by changing one or more components in a version of the AV software and releasing a new software version. The fleet management system 120 may also provide information to AVs 110 for the AVs 110 to operate based on the information. For instance, the fleet management system 120 may provide information about environmental conditions to AVs 110. An environment condition may be a condition in an environment where one or more AVs 110 operate or will operate. Examples of environmental conditions include weather condition (e.g., rain, snow, wind, etc.), road condition (e.g., road closures, water accumulation, road grade indicating a rate of change of the road elevation, etc.), traffic condition (e.g., traffic congestion, accidents, etc.), other types of environmental conditions, or some combination thereof. An AV 110 may use one or more environmental conditions to control its operation, e.g., to control its motions in the environment.

In some embodiments, the fleet management system 120 may manage one or more services that the fleet of AVs 110 provides to the users 135. An example service is a ride service, e.g., an AV 110 provides a ride to a user 135 from a first location to a second location. Another example service is a delivery service, e.g., an AV 110 delivers one or more items from or to the user 135. The fleet management system 120 can select one or more AVs 110 (e.g., AV 110A) to perform a particular service, and instructs the selected AV to drive to one or more particular locations associated with the service (e.g., a first address to pick up user 135A, and a second address to pick up user 135B). The fleet management system 120 also manages fleet maintenance tasks, such as fueling, inspecting, and servicing of the AVs. As shown in FIG. 1, the AVs 110 communicate with the fleet management system 120. The AVs 110 and fleet management system 120 may connect over a network, such as the Internet.

In some embodiments, the fleet management system 120 may receive service requests for the AVs 110 from the client devices 130. In an example, the user 135A may access an app executing on the client device 130A and requests a ride from a pickup location (e.g., the current location of the client device 130A) to a destination location. The client device 130A may transmit the ride request to the fleet management system 120. The fleet management system 120 may select an AV 110 from the fleet of AVs 110 and dispatches the selected AV 110A to the pickup location to carry out the ride request. In some embodiments, the ride request may further include a number of passengers in the group. In some embodiments, the ride request may indicate whether a user 135 is interested in a shared ride with another user traveling in the same direction or along the same portion of a route. The ride request, or settings previously entered by the user 135, may further indicate whether the user 135 is interested in interaction with another passenger. Certain aspects of the fleet management system 120 are described below in conjunction with FIG. 6.

A client device 130 may be a device capable of communicating with the fleet management system 120, e.g., via one or more networks. The client device 130 can transmit data to the fleet management system 120 and receive data from the fleet management system 120. The client device 130 can also receive user input and provide outputs. In some embodiments, outputs of the client devices 130 are in human-perceptible forms, such as text, graphics, audio, video, and so on. The client device 130 may include various output components, such as monitors, speakers, headphones, projectors, and so on. The client device 130 may be a desktop or a laptop computer, a smartphone, a mobile telephone, a personal digital assistant (PDA), or another suitable device.

In some embodiments, a client device 130 executes an application allowing a user 135 of the client device 130 to interact with the fleet management system 120. For example, a client device 130 executes a browser application to enable interaction between the client device 130 and the fleet management system 120 via a network. In another embodiment, a client device 130 interacts with the fleet management system 120 through an application programming interface (API) running on a native operating system of the client device 130, such as IOS® or ANDROID™. The application may be provided and maintained by the fleet management system 120. The fleet management system 120 may also update the application and provide the update to the client device 130.

In some embodiments, a user 135 may submit one or more service requests to the fleet management system 120 through a client device 130. A client device 130 may provide its user 135 a user interface (UI), through which the user 135 can make service requests, such as ride request (e.g., a request to pick up a person from a pickup location and drop off the person at a destination location), delivery request (e.g., a request to deliver one or more items from a location to another location), and so on. The UI may allow users 135 to provide locations (e.g., pickup location, destination location, etc.) or other information that would be needed by AVs 110 to provide services requested by the users 135. The client device 130 may also provide the user 135 an UI through which the user 135 may specify preference for AV motions during an AV service that has been requested or to be requested by the user 135. For example, the user 135 may specify, through the UI, how fast the user 135 prefers the AV 110 to move, turn, stop, accelerate, or deaccelerate.

The AV 110 is preferably a fully autonomous automobile, but may additionally or alternatively be any semi-autonomous or fully autonomous vehicle, e.g., a boat, an unmanned aerial vehicle, a driverless car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle. In some embodiments, some or all of the vehicle fleet managed by the fleet management system 120 are non-autonomous vehicles dispatched by the fleet management system 120, and the vehicles are driven by human drivers according to instructions provided by the fleet management system 120.

The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions, e.g., windshield wipers, headlights, turn indicators, air conditioning, etc.

The sensor suite 140 may detect conditions inside and outside the AV 110. For instance, the sensor suite 140 may detect conditions in an environment surrounding the AV 110. The sensor suite 140 may include a computer vision ("CV") system, localization sensors, and driving sensors. For example, the sensor suite 140 may include interior and exterior cameras, RADAR sensors, sonar sensors, LIDAR sensors, thermal sensors, wheel speed sensors, inertial measurement units (IMUs), accelerometers, microphones, strain gauges, pressure monitors, barometers, thermometers, altimeters, ambient light sensors, etc. The sensors may be located in various positions in and around the AV 110. For example, the AV 110 may have multiple cameras located at different positions around the exterior and/or interior of the AV 110. Certain sensors of the sensor suite 140 are described further in relation to FIG. 2.

The onboard computer 150 is connected to the sensor suite 140 and functions to control the AV 110 and to process sensed data from the sensor suite 140 and/or other sensors to determine the state of the AV 110. Based upon the vehicle state and programmed instructions, the onboard computer 150 modifies or controls behavior of the AV 110. The onboard computer 150 may be preferably a general-purpose computer adapted for I/O communication with vehicle control systems and sensor suite 140 but may additionally or alternatively be any suitable computing device. The onboard computer 150 is preferably connected to the Internet via a wireless connection (e.g., via a cellular data connection).

Additionally or alternatively, the onboard computer 150 may be coupled to any number of wireless or wired communication systems.

In some embodiments, the onboard computer 150 is in communication with the fleet management system 120, e.g., through a network. The onboard computer 150 may receive instructions from the fleet management system 120 and control behavior of the AV 110 based on the instructions. For example, the onboard computer 150 may receive from the fleet management system 120 an instruction for providing a ride to a user 135. The instruction may include information of the ride (e.g., pickup location, drop-off location, intermediate stops, etc.), information of the user 135 (e.g., identifying information of the user 135, contact information of the user 135, etc.). The onboard computer 150 may determine a navigation route of the AV 110 based on the instruction.

As another example, the onboard computer 150 may receive from the fleet management system 120 a request for sensor data to be used for determining environmental conditions. The onboard computer 150 may control one or more sensors of the sensor suite 140 to detect the user 135, the AV 110, or an environment surrounding the AV 110 based on the instruction and further provide the sensor data from the sensor suite 140 to the fleet management system 120. The onboard computer 150 may transmit other information requested by the fleet management system 120, such as perception of the AV 110 that is determined by a perception module of the onboard computer 150, historical data of the AV 110, and so on. Certain aspects of the onboard computer 150 are described further in relation to FIG. 6.

Example Sensor Suite

Figure 2:
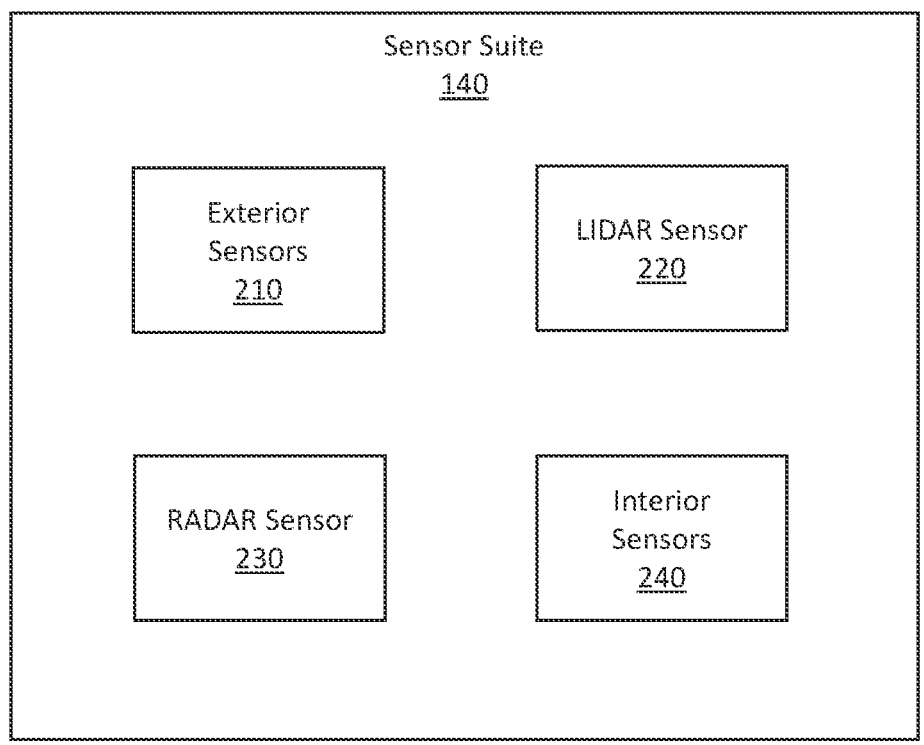
FIG. 2 is a block diagram showing a sensor suite, according to some embodiments of the present disclosure.

FIG. 2 is a block diagram showing the sensor suite 140, according to some embodiments of the present disclosure. The sensor suite 140 may be an onboard sensor suite of an AV, e.g., AV 110 in FIG. 1. The sensor suite 140 includes exterior sensors 210, a LIDAR sensor 220, a RADAR sensor 230, and interior sensors 240. The sensor suite 140 may include any number of the types of sensors shown in FIG. 2, e.g., one or more LIDAR sensors 220, one or more RADAR sensors 230, etc. The sensor suite 140 may have more types of sensors than those shown in FIG. 2, such as the sensors described with respect to FIG. 1. In other embodiments, the sensor suite 140 may not include one or more of the sensors shown in FIG. 2.

The exterior sensors 210 may detect objects in an environment around the AV. The environment may include a scene in which the AV operates. Example objects include persons, buildings, traffic lights, traffic signs, vehicles, street signs, trees, plants, animals, or other types of objects that may be present in the environment around the AV. In some embodiments, the exterior sensors 210 include exterior cameras having different views, e.g., a front-facing camera, a back-facing camera, and side-facing cameras. One or more exterior sensors 210 may be implemented using a high-resolution imager with a fixed mounting and field of view. One or more exterior sensors 210 may have adjustable field of views and/or adjustable zooms. In some embodiments, the exterior sensors 210 may operate continually during operation of the AV. In an example embodiment, the exterior sensors 210 capture sensor data (e.g., images, etc.) of a scene in which the AV drives. In other embodiment, the exterior sensors 210 may operate in accordance with an instruction from the onboard computer 150 or an external system, such as the environmental condition module 620 or the vehicle manager 630 of the fleet management system 120. Some of all of the exterior sensors 210 may capture sensor data of one or more objects in an environment surrounding the AV based on the instruction.

The LIDAR sensor 220 may measure distances to objects in the vicinity of the AV using reflected laser light. The LIDAR sensor 220 may be a scanning LIDAR that provides a point cloud of the region scanned. The LIDAR sensor 220 may have a fixed field of view or a dynamically configurable field of view. The LIDAR sensor 220 may produce a point cloud that describes, among other things, distances to various objects in the environment of the AV.

The RADAR sensor 230 may measure ranges and speeds of objects in the vicinity of the AV using reflected radio waves. The RADAR sensor 230 may be implemented using a scanning RADAR with a fixed field of view or a dynamically configurable field of view. The RADAR sensor 230 may include one or more articulating RADAR sensors, long-range RADAR sensors, short-range RADAR sensors, or some combination thereof.

The interior sensors 240 may detect the interior of the AV, such as objects inside the AV. Example objects inside the AV include users (e.g., passengers), client devices of users, components of the AV, items delivered by the AV, items facilitating services provided by the AV, and so on. The interior sensors 240 may include multiple interior cameras to capture different views, e.g., to capture views of an interior feature, or portions of an interior feature. The interior sensors 240 may be implemented with a fixed mounting and fixed field of view, or the interior sensors 240 may have adjustable field of views and/or adjustable zooms, e.g., to focus on one or more interior features of the AV. The interior sensors 240 may transmit sensor data to a perception module (such as the perception module 330 described below in conjunction with FIG. 3), which can use the sensor data to classify a feature and/or to determine a status of a feature.

In some embodiments, the interior sensors 240 include on or more input sensors that allow users 135 to provide input. For instance, a user 135 may use an input sensor to provide information indicating his/her preference for one or more motions of the AV during the ride. The input sensors may include touch screen, microphone, keyboard, mouse, or other types of input devices. In an example, the interior sensors 240 include a touch screen that is controlled by the onboard computer 150. The onboard computer 150 may present questionnaires on the touch screen and receive user answers to the questionnaires through the touch screen. A questionnaire may include one or more questions about AV motions. The onboard computer 150 may receive the questions from the fleet management system 120. In some embodiments, some or all of the interior sensors 240 may operate continually during operation of the AV. In other embodiment, some or all of the interior sensors 240 may operate in accordance with an instruction from the onboard computer 150 or an external system, such as the fleet management system 120.

Example Onboard Computer

Figure 3:
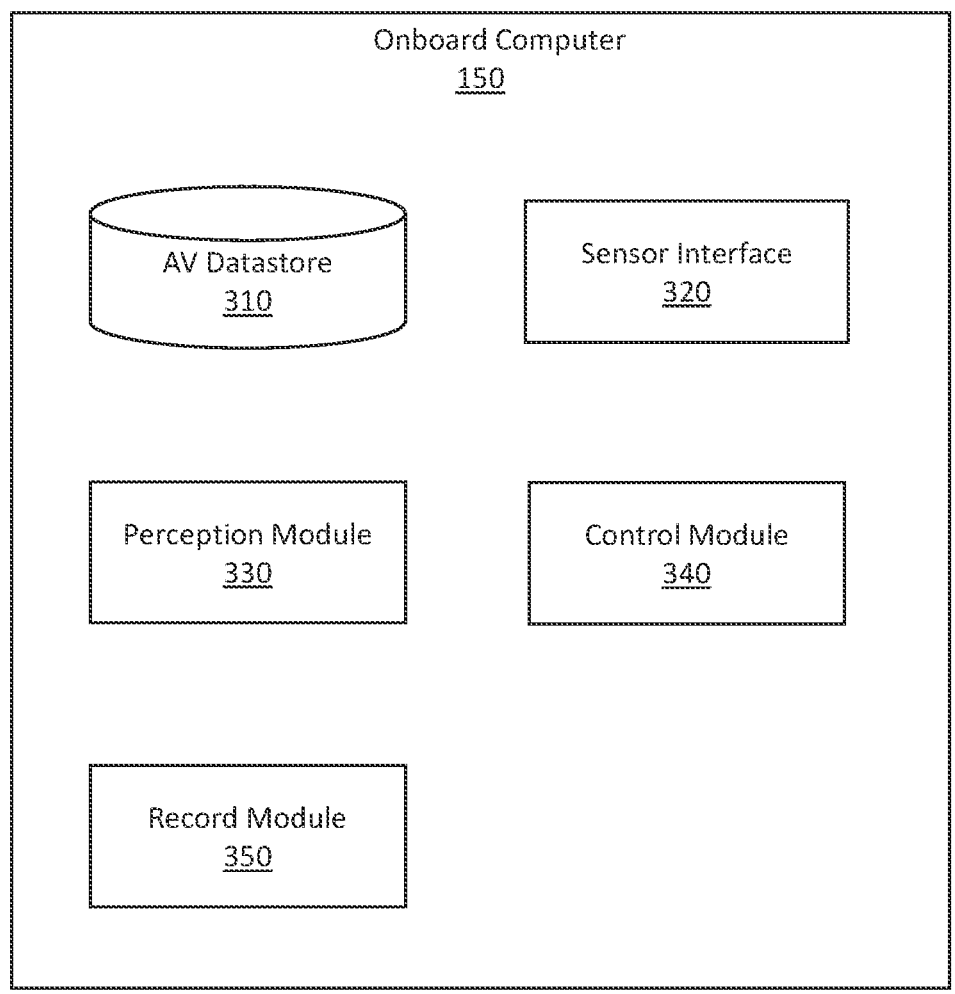
FIG. 3 is a block diagram showing an onboard computer, according to some embodiments of the present disclosure.

FIG. 3 is a block diagram showing the onboard computer 150 according to some embodiments of the present disclosure. The onboard computer 150 may control an AV, e.g., AV 110 in FIG. 1. As shown in FIG. 3, the onboard computer 150 includes an AV datastore 310, a sensor interface 320, a perception module 330, a control module 340, and a record module 350. In alternative configurations, fewer, different and/or additional components may be included in the onboard computer 150. For example, components and modules for conducting route planning, controlling movements of the AV, and other vehicle functions are not shown in FIG.

3. Further, functionality attributed to one component of the onboard computer 150 may be accomplished by a different component included in the onboard computer 150 or a different system, such as the fleet management system 120.

The AV datastore 310 stores data associated with operations of the AV. The AV datastore 310 may store one or more operation records of the AV. An operation record is a record of an operation of the AV, e.g., an operation for providing a ride service. The operation record may include information indicating operational behaviors of the AV during the operation. The operations record may also include data used, received, or captured by the AV during the operation, such as map data, instructions from the fleet management system 120, sensor data captured by the AV, and so on. In some embodiments, the AV datastore 310 stores a detailed map that includes a current environment of the AV. The AV datastore 310 may store data in the map datastore 250. In some embodiments, the AV datastore 310 stores a subset of the map datastore 250, e.g., map data for a city or region in which the AV is located.

The sensor interface 320 interfaces with the sensors in the sensor suite 140. The sensor interface 320 may request data from the sensor suite 140, e.g., by requesting that a sensor capture data in a particular direction or at a particular time. For example, the sensor interface 320 instructs the sensor suite 140 to capture sensor data of an environment surrounding the AV, e.g., by sending a request for sensor data to the sensor suite 140. In some embodiments, the request for sensor data may specify which sensor(s) in the sensor suite 140 to provide the sensor data, and the sensor interface 320 may request the sensor(s) to capture data. The request may further provide one or more settings of a sensor, such as orientation, resolution, accuracy, focal length, and so on. The sensor interface 320 can request the sensor to capture data in accordance with the one or more settings.

A request for sensor data may be a request for real-time sensor data, and the sensor interface 320 can instruct the sensor suite 140 to immediately capture the sensor data and to immediately send the sensor data to the sensor interface 320. The sensor interface 320 is configured to receive data captured by sensors of the sensor suite 140, including data from exterior sensors mounted to the outside of the AV, and data from interior sensors mounted in the passenger compartment of the AV. The sensor interface 320 may have subcomponents for interfacing with individual sensors or groups of sensors of the sensor suite 140, such as a camera interface, a LIDAR interface, a RADAR interface, a microphone interface, etc.

The perception module 330 identifies objects and/or other features captured by the sensors of the AV. For example, the perception module 330 identifies objects in the environment of the AV and captured by one or more sensors (e.g., the sensors 210-230). As another example, the perception module 330 determines one or more environmental conditions based on sensor data from one or more sensors (e.g., the sensors 210-230). The perception module 330 may include one or more classifiers trained using machine learning to identify particular objects. For example, a multi-class classifier may be used to classify each object in the environment of the AV as one of a set of potential objects, e.g., a vehicle, a pedestrian, or a cyclist. As another example, a pedestrian classifier recognizes pedestrians in the environment of the AV, a vehicle classifier recognizes vehicles in the environment of the AV, etc. The perception module 330 may identify travel speeds of identified objects based on data from the RADAR sensor 230, e.g., speeds at which other vehicles, pedestrians, or birds are traveling. As another example, the perception module 33—may identify distances to identified objects based on data (e.g., a captured point cloud) from the LIDAR sensor 220, e.g., a distance to a particular vehicle, building, or other feature identified by the perception module 330. The perception module 330 may also identify other features or characteristics of objects in the environment of the AV based on image data or other sensor data, e.g., colors (e.g., the colors of Christmas lights), sizes (e.g., heights of people or buildings in the environment), makes and models of vehicles, pictures and/or words on billboards, etc.

In some embodiments, the perception module 330 fuses data from one or more interior sensors 240 with data from exterior sensors (e.g., exterior sensors 210) and/or AV datastore 310 to identify environmental objects that one or more users are looking at. The perception module 330 determines, based on an image of a user, a direction in which the user is looking, e.g., a vector extending from the user and out of the AV in a particular direction. The perception module 330 compares this vector to data describing features in the environment of the AV, including the features' relative location to the AV (e.g., based on real-time data from exterior sensors and/or the AV's real-time location) to identify a feature in the environment that the user is looking at.

While a single perception module 330 is shown in FIG. 3, in some embodiments, the onboard computer 150 may have multiple perception modules, e.g., different perception modules for performing different ones of the perception tasks described above (e.g., object perception, speed perception, distance perception, feature perception, facial recognition, mood determination, sound analysis, gaze determination, etc.).

The control module 340 controls operations of the AV, e.g., based on information from the sensor interface 320 or the perception module 330. The control module 340 may determine motion capacities of the AV, e.g., based on conditions in environments where the AV operates, preferences of users requesting services conducted by the AV, other type of information, or some combination thereof. The control module 340 may include multiple planning modules ("planners") that can plan motions of the AV during the AV's operations based on the AV's motion capabilities. A motion capability is a capability of the AV making a motion, e.g., accelerating, decelerating, turning, stopping, and so on. The control module 340 may constrain the motion of the AV within the AV's capability, e.g., for the purpose of ensuring a desired performance of the AV. The desired performance of the AV may be a desired level of operational safety, a desired level of passenger comfort, or a combination of both. Motion capacities can be broadcasted to the multiple planners, e.g., based on requests of the planners. The planners may plan for motions of the AV based on capabilities of the AV for different types of motions. The broadcasting of the motion capabilities of the AV can facilitate efficiency of the control module 340 as the motion capabilities can be provided from a single source. More details regarding broadcasting vehicle capabilities are described below in conjunction with FIGS. 5 and 7.

In some embodiments, the control module 340 controls operation of the AV by using a trained model, such as a trained neural network. The control module 340 may provide input data to the control model, and the control model outputs operation parameters for the AV. The input data may include sensor data from the sensor interface 320 (which may indicate a current state of the AV), objects identified by the perception module 330, or both. The operation parameters are parameters indicating operation to be performed by the AV. The operation of the AV may include perception, prediction, planning, localization, motion, navigation, other types of operation, or some combination thereof.

The control module 340 may provide instructions to various components of the AV based on the output of the control model, and these components of the AV will operate in accordance with the instructions. In an example where the output of the control model indicates that a change of traveling speed of the AV is required given a prediction of traffic condition, the control module 340 may instruct the motor of the AV to change the traveling speed of the AV. In another example where the output of the control model indicates a need to detect characteristics of an object in the environment around the AV (e.g., detect a speed limit), the control module 340 may instruct the sensor suite 140 to capture an image of the speed limit sign with sufficient resolution to read the speed limit and instruct the perception module 330 to identify the speed limit in the image. Certain aspects of the control module 340 are described below in conjunction with FIG. 4.

The record module 350 generates operation records of the AV and stores the operations records in the AV datastore 310. The record module 350 may generate an operation record in accordance with an instruction from the fleet management system 120, e.g., the vehicle manager 630. The instruction may specify data to be included in the operation record. The record module 350 may determine one or more timestamps for an operation record. In an example of an operation record for a ride service, the record module 350 may generate timestamps indicating the time when the ride service starts, the time when the ride service ends, times of specific AV behaviors associated with the ride service, and so on. The record module 350 can transmit the operation record to the fleet management system 120.

Example Control Module with Vehicle Capacity Broadcaster

Figure 4:
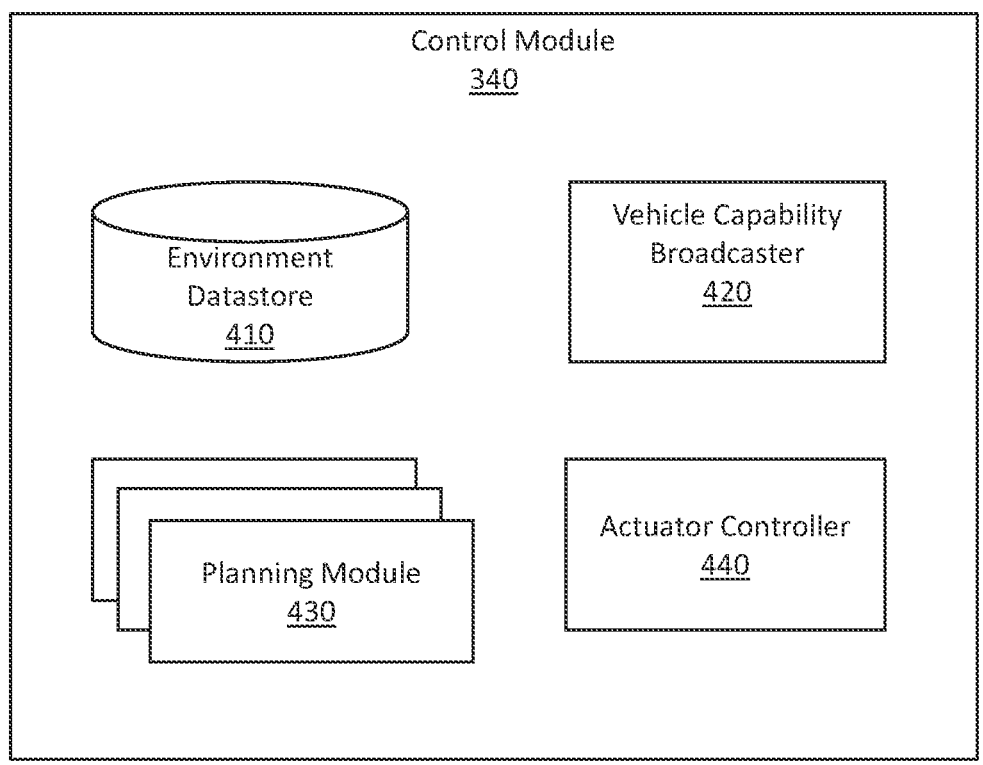
FIG. 4 is a block diagram showing a control module, according to some embodiments of the present disclosure.

FIG. 4 is a block diagram showing the control module 340, according to some embodiments of the present disclosure. The control module 340 includes an environment datastore 410, a vehicle capability broadcaster 420, planning modules 430 (individually referred to as "planning module 430"), and an actuator controller 440. In alternative configurations, different and/or additional components may be included in the control module 340. For example, the control module 340 may include a different number of planning modules 430 from the number shown in FIG. 4. Further, functionality attributed to one component of the control module 340 may be accomplished by a different component included in the control module 340 or a different module.

The environment datastore 425 may store data of environment conditions that can be used by the vehicle capability broadcaster 420 to determine capabilities of the AV. The data may include sensor data capturing one or more environments where the AV operates, e.g., operates to provide services. The sensor data may be from the sensor suite 140 of the AV. The data may also include perception data that identifies one or more environmental conditions. The perfection data may be from the perception module 330 of the onboard computer 150 of the AV. The data may also include external data, e.g., data from other AVs or systems. For example, the data in the environment datastore 425 may include data (e.g., sensor data, perception, etc.) from one or more other AVs that capture one or more environments where the other AVs operate. As another example, the data in the environment datastore 425 may include data from the fleet management system 120, e.g., the environmental condition module 620 in FIG. 6. In yet another example, the data in the environment datastore 425 may include data from one or more third-party systems that provide information of environments where the AV operates. The AV may be in communication with the one or more third-party systems, e.g., through a network.

The vehicle capability broadcaster 420 may determine motion capabilities of the AV based on data in the environment datastore 425 and broadcast the motion capabilities of the AV to the planning modules 430. The vehicle capability broadcaster 420 may determine vehicle capability parameters that indicate capabilities of the AV making motions under one or more environmental conditions. A vehicle capability parameter may be a limit for a type of motion that the AV can make under the one or more environmental conditions without compromising a performance (e.g., operation safety, passenger comfort, etc.) of the AV or a limit for a type of the motion that the AV can make to meet a performance requirement. The performance requirement may be a predetermined level of operation safety, a predetermined level of passenger comfort, or a combination of both.

In some embodiments, the vehicle capability broadcaster 420 may broadcast vehicle capability parameters to the planning modules 430 based on queries from planning modules 430. Different planning modules 430 may query for the same vehicle capability parameter or different vehicle capability parameters. In some embodiments, the vehicle capability broadcaster 420 may provide a query interface for one or more of the planning modules 430. The query interface can facilitate transmission of queries for vehicle capability parameters and vehicle capability parameters between the planning modules 430 and the vehicle capability broadcaster 420.

In other embodiments, the vehicle capability broadcaster 420 may generate a single package of some or all available vehicle capability parameters for an environmental condition, such as the latest environment condition or the current environment condition. The vehicle capability broadcaster 420 may transmit the package to some or all of the planning modules 430. Each planning module 430, after receiving the package, may generate a customized object from the package. The customized object includes one or more customized vehicle capability parameters that are specific to the planning module 430. In an embodiment, each planner module may construct its own object based on its planning type. The vehicle capability objects of different planning modules 430 can be different.

The planning module 430 may query the object, and the one or more customized vehicle capability parameters in the object may be returned after the planning module 430 queries the object. The object of a planning module 430 may include a subset of the vehicle capability parameters in the package created. The planning module 430, in the process of creating the object, may change the value(s) of one or more vehicle capability parameters so that the same vehicle capability parameter may have a different value in the object from the package or from the object of a different planning module 430. There can be custom variations on the vehicle capability parameters included in the package. In an example where the vehicle capability broadcaster 420 determines a speed limit value based on an environmental condition, a planning module 430 may receive 90% of the speed limit value, another planning module 430 may receive 70% of the speed limit value, yet another planning module 430 may receive 100% of the speed limit value. Certain aspects of the vehicle capability broadcaster 420 are described below in conjunction with FIG. 5.

The planning modules 430 make plans for operations of the AV based on motion capabilities of the AV that are determined and provided by the vehicle capability broadcaster 420. The planning modules 430 may plan for motions of the AV in an operation based on motion capabilities of the AV in the operation. For instance, the planning modules 430 may determine a motion parameter that specifies a motion to be performed by the AV in the operation. The motion parameter may be a speed, acceleration rate, deceleration rate, jerk, snap, curvature, orientation, etc. The motion parameter may be determined based on one or more vehicle capability parameters. In some embodiments, the value of the motion parameter may fall into a limit specified by a vehicle capability parameter.

Different planning modules 430 may make different plans for the AV. The planning modules 430 may use different models to make the different plans. In some embodiments, the planning modules 430 may produce a single plan for the operation of the AV. In an example, the planning modules 430 may run in a sequence. A planning module 430 may generate a plan based on one or more vehicle capability parameters. Another planning module 430 may generate another plan based on the plan and one or more vehicle capability parameters. The output from the last planning module 430 in the sequence may be the final plan for the AV's operation. The output may include commands, e.g., commands to one or more actuators in the AV. Certain aspects of the planning modules 430 are described below in conjunction with FIG. 5.

The actuator controller 440 may control one or more actuators in the AV based on an output of the planning modules 430. In some embodiments, the actuator controller 440 may execute commands in the output of the planning modules 430 to drive operations of the one or more actuators. The operations of the actuators can cause the AV motions planned by the planning modules 430.

Figure 5:
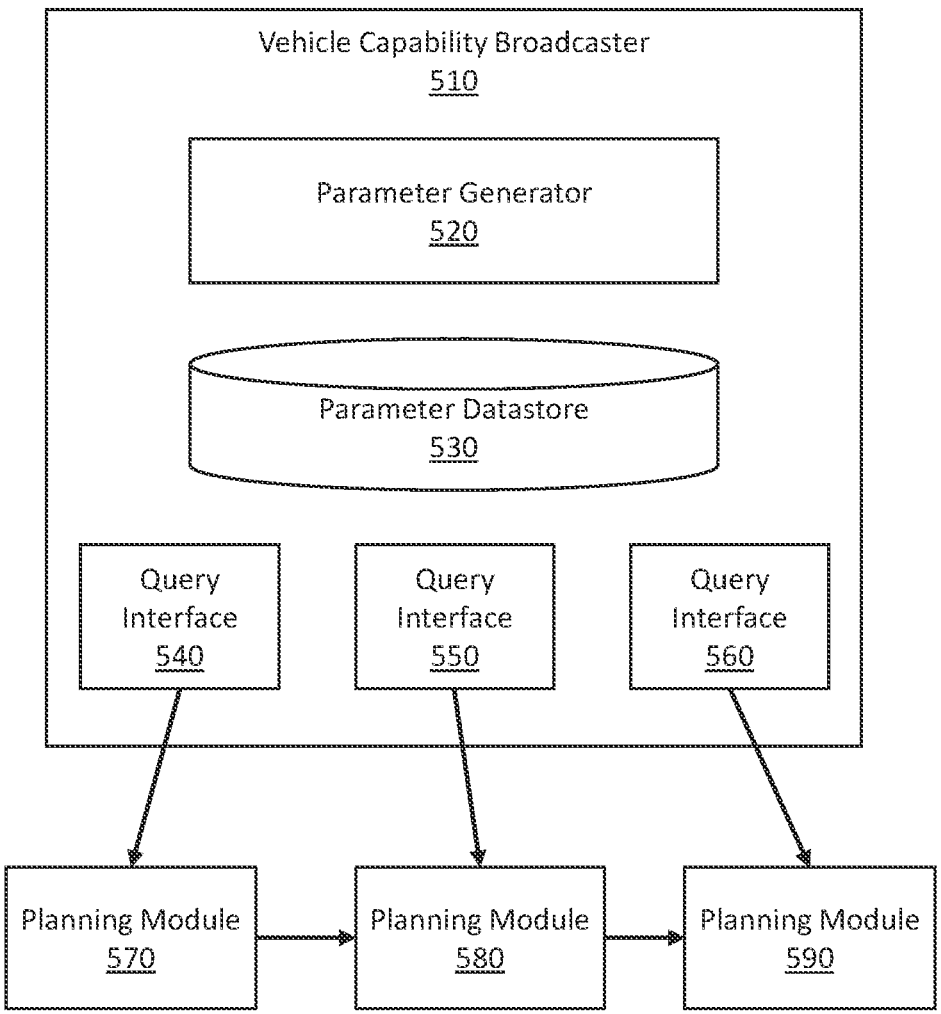
FIG. 5 illustrates a vehicle capability broadcasting platform, according to some embodiments of the present disclosure.

FIG. 5 illustrates a vehicle capability broadcasting platform 500, according to some embodiments of the present disclosure. The vehicle capability broadcasting platform 500 includes a vehicle capability broadcaster 510 that broadcasts vehicle capabilities to planning modules 570, 580, and 590. The vehicle capability broadcaster 510 may be an embodiment of the vehicle capability broadcaster 420 in FIG. 4. The planning modules 570, 580, and 590 may be examples of the planning modules 430 in FIG. 4.

As shown in FIG. 5, the vehicle capability broadcaster 510 includes a parameter generator 520, a parameter datastore 530, and query interfaces 540, 550, and 560. The query interfaces 540, 550, and 560 are in communication with the planning modules 570, 580, and 590, respectively. A query interface 540, 550, or 560 may be customized for the corresponding planning modules 570, 580, or 590. For instance, a query interface 540, 550, or 560 may be set to transmit vehicle capability parameters needed by the corresponding planning modules 570, 580, or 590 and not to transmit any vehicle capability parameter not needed by the corresponding planning modules 570, 580, or 590. In alternative configurations, different and/or additional components may be included in the vehicle capability broadcaster 510. For example, the vehicle capability broadcaster 510 may include a different number of query interfaces. In some embodiments, the vehicle capability broadcaster 510 may include a single query interface in communication with the planning modules 570, 580, and 590. Further, functionality attributed to one component of the vehicle capability broadcaster 510 may be accomplished by a different component included in the vehicle capability broadcaster 510 or a different module.

The parameter generator 520 may determine one or more vehicle capability parameters of an AV based on environmental conditions in an environment where the AV operates or is to operate. An environmental condition may be a weather condition, road condition, traffic condition, other types of environmental conditions, or some combination thereof. The parameter generator 520 may receive an environmental condition from one or more sensors in the sensor suite 140 of the AV, one or more other AVs (e.g., an AV that has operated or is operated in the same environment and detects the environmental condition), the fleet management system 120, a third-party system (e.g., a weather forecast system, traffic reporting system, etc.), other sources that can provide information of environmental conditions, or some combination thereof.

A vehicle capability parameter indicates a capability of the AV for making a motion. The parameter generator 520 may generate vehicle capability parameters for different types of AV motions. In some embodiments, a vehicle capability parameter may indicate a limit or constraint of the AV making a motion. The AV performance may be compromised when the AV have a motion beyond the limit or constraint, e.g., the operation of the AV may be unsafe, the passenger in the AV may be uncomfortable, or both. Examples of the vehicle capability parameters include speed limit, acceleration limit, deceleration limit, jerk limit (e.g., maximum or minimum rate of change of acceleration), curvature limit, snap limit, brake jitter cutoff frequency limit, and so on. A limit may be a maximum limit or a minimum limit.

In an embodiment, the parameter generator 520 may determine one or more road parameters based on one or more environmental conditions and determine one or more vehicle capability parameters based on the or more road parameters. An example road parameter is road grade, which indicates the rate of change of road elevation, e.g., the change in road elevation for every fixed horizontal distance (e.g., 100 feet, etc.). Another example road parameter is road friction factor (e.g., a coefficient of friction of a road under the one or more environmental conditions) or a traction factor (e.g., a friction between AV tires and a road under the one or more environmental conditions). A road parameter may have different values under different environmental conditions. For instance, the road friction factor is higher for a dry road than a wet road.

Alternatively or additionally, the parameter generator 520 may determine one or more vehicle capability parameters based on a user preference. In an example, the parameter generator 520 may determine one or more vehicle capability parameters for an AV providing a ride service to a passenger based on the passenger's preference for one or more AV motions during the ride. In another example, the parameter generator 520 may determine one or more vehicle capability parameters for an AV providing a delivery service to a user based on the user's preference for one or more AV motions during the delivery.

In some embodiments, the parameter generator 520 may determine a vehicle capability parameter based on one or more environmental conditions and then adjust the vehicle capability parameter based on a user preference. For instance, the parameter generator 520 may determine that a deceleration limit based on the one or more environmental conditions and then lower the deceleration limit based on a user preference for soft braking. In other embodiments, the parameter generator 520 may determine a vehicle capability parameter based on a user preference and then adjust the vehicle capability parameter based on one or more environmental conditions. For instance, the parameter generator 520 may determine that a deceleration limit based on a user preference for harsh braking but then lower the deceleration limit based on a weather condition (e.g., raining, snowing, etc.) in the environment. A user preference may be provided by the user, e.g., through a sensor of the AV or through a client device in communication with the fleet management system 120 (e.g., the client device interface 610 in the fleet management system 120). Additionally or alternatively, a user preference may be determined or inferred based on a profile of the user, historical data of the user (e.g., data about historical AV rides taken by the user), preferences of similar users, and so on.

In some embodiments, the parameter generator 520 may determine vehicle capability parameters by using a machine learning model. The parameter generator 520 may input one or more environmental conditions (or one or more user preferences, or both) into a model, and the model outputs one or more vehicle capability parameters. A user preference may be an explicit preference provided by the user or an implicit preference determined based on information of the user or information of similar users, e.g., information in the user datastore 640. The parameter generator 520 may include or be associated with a training module that trains the model with machine learning techniques.

As part of the generation of the model, the training module may form a training set. The training set may include training samples and ground-truth labels of the training samples. A training sample may include a set of data associated with one or more environmental conditions or one or more user preferences that are related to vehicle capabilities. The training sample may have one or more ground-truth labels, e.g., one or more vehicle capability parameters that have been verified or known to indicate true vehicle capabilities. The training module extracts feature values from the training set, the features being variables deemed potentially relevant to vehicle capabilities. An ordered list of the features for a ride service may be a feature vector for the ride service. In one embodiment, the training module applies dimensionality reduction (e.g., via linear discriminant analysis (LDA), principle component analysis (PCA), or the like) to reduce the amount of data in the feature vectors for ride services to a smaller, more representative set of data. The training module may use supervised machine learning to train the model. Different machine learning techniques-such as linear support vector machine (linear SVM), boosting for other algorithms (e.g., Ada-Boost), neutral networks, logistic regression, naïve Bayes, memory-based learning, random forests, bagged trees, decision trees, boosted trees, or boosted stumps—may be used in different embodiments.

Vehicle capability parameters generated by the parameter generator 520 are stored in the parameter datastore 530. Vehicle capability parameters can be retrieved from the parameter datastore 530 by one or more of the query interfaces 540, 550, and 560 to be provided to one or more of the planning modules 570, 580, and 590. In the embodiments of FIG. 5, the query interface 540 may be customized for the planning module 570 for providing one or more vehicle capability parameters to be needed by the planning module 570. Similarly, the query interface 550 may be customized for the planning module 580 for providing one or more vehicle capability parameters to be needed by the planning module 580, and the query interface 560 may be customized for the planning module 590 for providing one or more vehicle capability parameters to be needed by the planning module 590.

In other embodiments, the vehicle capability broadcaster 510 may provide a single query interface for the planning modules 570, 580, and 590. In an example, the vehicle capability broadcaster 510 may use a single query interface to transmit a same package of one or more vehicle capability parameters to the planning modules 570, 580, and 590. After receiving the package, the planning modules 570, 580, and 590 may customize the package and generate objects that are specific to planning types of the planning modules 570, 580, and 590. The planning modules 570, 580, and 590 may generate different objects. An object may include some (e.g., at least one) or all of the vehicle capability parameters in the package from the vehicle capability broadcaster 510. The value of a vehicle capability parameter in the object may be different from the value of the vehicle capability parameter in the package or different from the value of the vehicle capability parameter in a different object (e.g., an object created by a different planning module).

In another example, the vehicle capability broadcaster 510 may use a single query interface to transmit one or more vehicle capability parameters to the planning module 570, but not directly to the planning module 580 or 590. In this example, the planning module 570 may be used as the top-level planning module, and the planning modules 580 and 590 are used as lower-level planning modules. The planning module 570 may transmit at least one of the one or more vehicle capability parameters to the planning module 580. The value of a vehicle capability parameter transmitted from the planning module 570 to the planning module 580 may be different from the value of the same vehicle capability parameter received by the planning module 570 from the vehicle capability broadcaster 510. For instance, the planning module 570 may have changed the value of the vehicle capability parameter before it sends the vehicle capability parameter to the planning module 580.

Similarly, the planning module 580 may transmit at least one of the one or more vehicle capability parameters to the planning module 590. The value of a vehicle capability parameter transmitted from the planning module 580 to the planning module 590 may be different from the value of the same vehicle capability parameter determined by the vehicle capability broadcaster 510 or the planning module 570. The planning module 580 may have changed the value of the vehicle capability parameter before it sends the vehicle capability parameter to the planning module 590. The vehicle capability parameter transmission flow in this example can ensure that even though the vehicle capability broadcaster 510 determines a new value of a vehicle capability parameter (e.g., due to a change in one or more environmental conditions) before all the planning modules 570, 580, and 590 can finish planning based on the previous value of the vehicle capability parameter, the planning modules 570, 580, and 590 can still plan AV operations based on the previous value of the vehicle capability parameter. This constitutes an asynchronous feature in the vehicle capability broadcasting platform. The asynchronous feature can negate unnecessary or undesired interruption in the planning and control of AV operations.

The planning modules 570, 580, and 590 may request for vehicle capability parameters through the query interfaces 540, 550, and 560, respectively. In response to the requests from the planning modules 570, 580, and 590, the vehicle capability broadcaster 510 may provide the vehicle capability parameters to the planning modules 570, 580, and 590 through the query interfaces 540, 550, and 560, respectively. The transmission of requests or vehicle capability parameters between the vehicle capability broadcaster 510 and different planning modules 570, 580, and 590 may occur at different times. For instance, the query interface 540 may receive a request from the planning module 570 before the query interface 550 receiving a request from the planning module 580, and the query interface 550 may receive a request from the planning module 580 before the query interface 560 receiving a request from the planning module 590.

Different planning modules 570, 580, and 590 may request and receive different vehicle capability parameters. In an example, the planning module 580 may request and receive acceleration limit or speed limit, versus the planning module 590 may request jerk limit or curvature limit. Different planning modules 570, 580, and 590 may request and receive the same vehicle capability parameter. In an example, the planning module 570 and the planning modules 580 may both request and receive acceleration limit or speed limit, and the planning module 570 and the planning modules 590 may both request and receive jerk limit or curvature limit.

The planning modules 570, 580, and 590 may have a hierarchy. In some embodiments, the planning modules 570, 580, and 590 may operate in a sequence, e.g., a temporal order. In some embodiments, the planning module 570 may produce a first plan based on one or more vehicle capability parameters received through the query interface 540. Then the planning module 580 may produce a second plan based on the first plan and one or more vehicle capability parameters received through the query interface 550. Further, the planning module 590 may produce a third plan based on the second plan and one or more vehicle capability parameters received through the query interface 560. In some embodiments, a plan generated by the planning module 570, 580, or 590 may include a motion parameter that specifies a motion of the AV. The motion parameter, e.g., may be a speed, jerk, snap, curvature, acceleration rate, deceleration rate, etc. The value of the motion parameter may be within the limit specified by one or more vehicle capacity parameters.

In an embodiment, the planning module 570 may plan maneuvers that the AV is to make during the operation in the environment, e.g., by taking into consideration all obstacles in the environment. The planning module 580 may plan motions that the AV is to make based on the maneuvers planned by the planning module 570 and one or more vehicle capability parameters. The planning module 580 may plan the motions further based on more recent perception or prediction of the AV than the planning module 570, e.g., by taking into consideration urgent obstacles in the environment. The planning module 590 may plan states (e.g., orientation (position, direction, or both), velocity, etc.) of the AV during the operation in the environment based on the motions planned by the planning module 570 and one or more vehicle capability parameters. The planning module 590 may, for instance, output a commanded acceleration required to achieve a desired acceleration determined by the planning module 580. A plan generated by the planning module 590 may be converted, e.g., by the planning module 590 or another planning module 590 not shown in FIG. 5, to commands (e.g., torque command, acceleration command, deceleration command, etc.) that can be sent to an actuator of the AV. The actuator may set states of the AV based on the commands.

Example Fleet Management System

Figure 6:
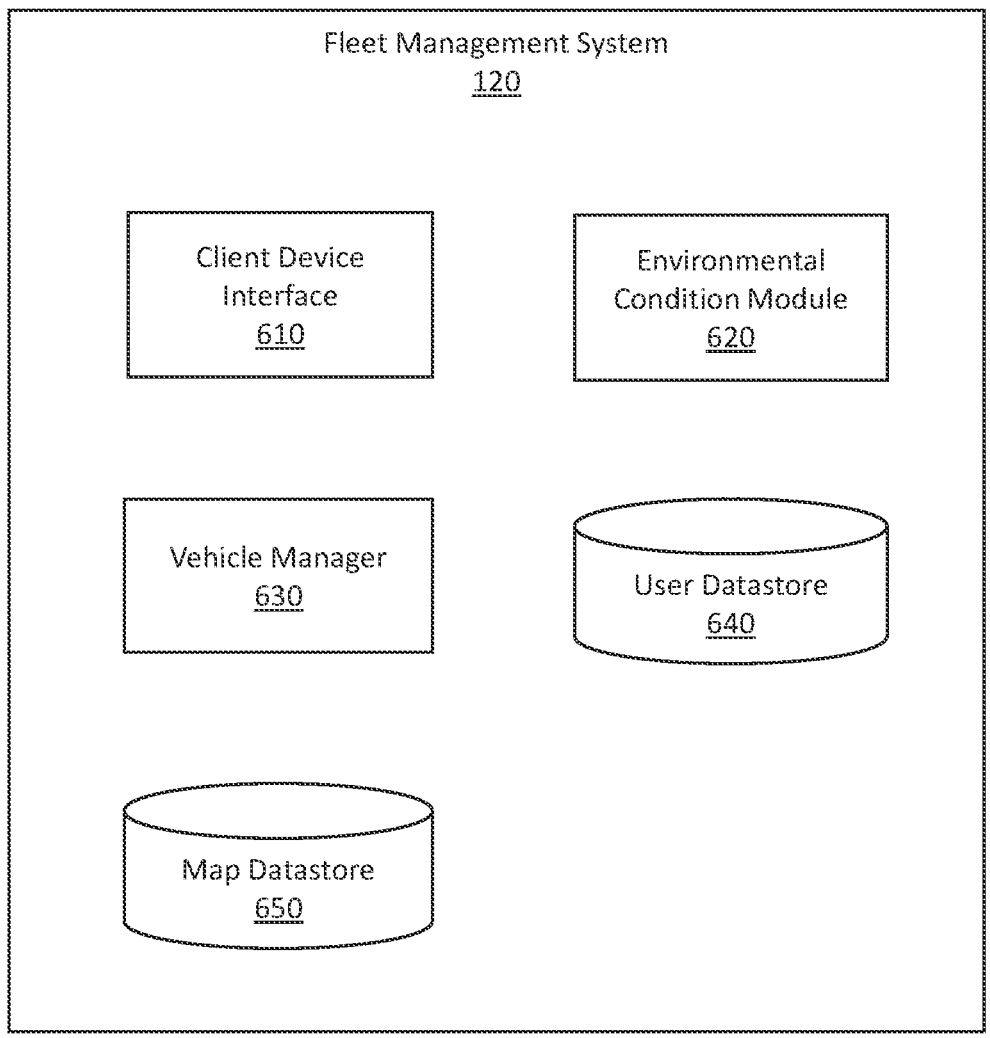
FIG. 6 is a block diagram showing a fleet management system, according to some embodiments of the present disclosure.

FIG. 6 is a block diagram showing the fleet management system 120, according to some embodiments of the present disclosure. The fleet management system 120 may manage and monitor AVs, e.g., AVs 110 in FIG. 1. In FIG. 6, the fleet management system 120 includes a client device interface 610, an environmental condition module 620, a vehicle manager 630, a user datastore 640, and a map datastore 650. In alternative configurations, different and/or additional components may be included in the fleet management system 120. Further, functionality attributed to one component of the fleet management system 120 may be accomplished by a different component included in the fleet management system 120 or a different system than those illustrated, such as the onboard computer 150.

The client device interface 610 may provide interfaces to client devices, such as headsets, smartphones, tablets, computers, and so on. The client device interface 610 may provide one or more apps or browser-based interfaces that can be accessed by users, such as the users 135, using client devices, such as the client devices 130. The client device interface 610 enables the users to submit requests to a ride service provided or enabled by the fleet management system 120. In an example, the client device interface 610 enables a user to submit a ride request that includes an origin (or pickup) location and a destination (or drop-off) location. The ride request may include additional information, such as a number of passengers traveling with the user, and whether or not the user is interested in a shared ride with one or more other passengers not known to the user. The client device interface 610 may enable the users to express their preferences for certain motions of the AV. The client device interface 610 may allow a user to indicate the user's preference for the AV's speed, acceleration rate, deceleration rate, jerk, snap, curvature, and so on. For instance, the client device interface 610 may allow a user to select whether the user prefers slow braking, normal braking, or harsh braking.

The environmental condition module 620 detects environmental conditions in association with operations of AVs. An environmental condition is a condition in an environment surrounding the AV. The condition may be a condition of an object (e.g., person, vehicle, traffic sign, building, tree, etc.) in the environment, a weather condition (e.g., rain, snow, ice, etc.), a traffic condition (e.g., traffic jam, road closure, etc.), or other types of environmental conditions. The environmental condition module 620 may detect an environmental condition based on data (e.g., sensor data, perceptions, etc.) from one or more AVs, such as the AV operating in the environment, the same AV operating in the environment at a different time, or another AV operating in the environment. The environmental condition module 620 may request such data from AVs.

In some embodiment, the environmental condition module 620 may search for one or more AVs that operate in the environment at or near a time of interest (e.g., the time of an AV behavior) and after finding these AVs, the environmental condition module 620 can request data from these AVs. In some embodiments (e.g., embodiments where the environmental condition module 620 cannot find any AV operating in the environment but for the AV providing the service), the environmental condition module 620 may request the vehicle manager 260 to send an AV to the environment and capture data needed by the environmental condition module 620. The environmental condition module 620 may provide an instruction to the AV. The instruction may include information of the environment (e.g., location), information of objects that need to be detected, specification of sensors to be used, setting of sensors, and so on.

The environmental condition module 620 may also use other data to detect environmental conditions. For instance, the environmental condition module 620 may retrieve data from a third-party system that publishes information related to environmental conditions. The third-party system may be a third-party reporting traffic conditions, a third-party predicting weather conditions, a social-media system, and so on.

The vehicle manager 630 manages and communicates with the fleet of AVs. The vehicle manager 630 assigns the AVs to various tasks and directs the movements of the AVs in the fleet. The vehicle manager 630 may instruct AVs to drive to other locations while not servicing a user, e.g., to improve geographic distribution of the fleet, to anticipate demand at particular locations, etc. The vehicle manager 630 may also instruct AVs to return to an AV facility for fueling, inspection, maintenance, or storage.

In some embodiments, the vehicle manager 630 selects AVs from the fleet to perform various tasks and instructs the AVs to perform the tasks. For example, the vehicle manager 630 receives a ride request from the client device interface 610. The vehicle manager 630 selects an AV to service the ride request based on the information provided in the ride request, e.g., the origin and destination locations. If multiple AVs in the AV fleet are suitable for servicing the ride request, the vehicle manager 630 may match users for shared rides based on an expected compatibility. For example, the vehicle manager 630 may match users with similar user interests, e.g., as indicated by the user datastore 640. In some embodiments, the vehicle manager 630 may match users for shared rides based on previously-observed compatibility or incompatibility when the users had previously shared a ride.

The vehicle manager 630 or another system may maintain or access data describing each of the AVs in the fleet of AVs, including current location, service status (e.g., whether the AV is available or performing a service; when the AV is expected to become available; whether the AV is schedule for future service), fuel or battery level, etc. The vehicle manager 630 may select AVs for service in a manner that optimizes one or more additional factors, including fleet distribution, fleet utilization, and energy consumption. The vehicle manager 630 may interface with one or more predictive algorithms that project future service requests and/or vehicle use and select vehicles for services based on the projections.

The vehicle manager 630 transmits instructions dispatching the selected AVs. In particular, the vehicle manager 630 instructs a selected AV to drive autonomously to a pickup location in the ride request and to pick up the user and, in some cases, to drive autonomously to a second pickup location in a second ride request to pick up a second user. The first and second user may jointly participate in a virtual activity, e.g., a cooperative game or a conversation. The vehicle manager 630 may dispatch the same AV to pick up additional users at their pickup locations, e.g., the AV may simultaneously provide rides to three, four, or more users. The vehicle manager 630 further instructs the AV to drive autonomously to the respective destination locations of the users.

The user datastore 640 stores information associated with users 135. The user datastore 640 stores information associated with rides requested or taken by the user 135. For instance, the user datastore 640 may store information of a ride currently being taken by a user 135, such as an origin location and a destination location for the user's current ride. The user datastore 640 may also store historical ride data for a user 135, including origin and destination locations, dates, and times of previous rides taken by a user. The user datastore 640 may also store expressions of the user 135 that are associated with a current ride or historical ride. In some cases, the user datastore 640 may further store future ride data, e.g., origin and destination locations, dates, and times of planned rides that a user has scheduled with the ride service provided by the AVs and fleet management system 120. Some or all of the information of a user 135 in the user datastore 640 may be received through the client device interface 610, an onboard computer (e.g., the onboard computer 150), a sensor suite of AVs (e.g., the sensor suite 140), a third-party system associated with the user and the fleet management system 120, or other systems or devices.

In some embodiments, the user datastore 640 stores data indicating user sentiments towards AV behaviors associated with ride services, such as information indicating whether a user feels comfortable or secured with an AV behavior. The fleet management system 120 may include one or more learning modules (not shown in FIG. 6) to learn user sentiments based on user data associated with AV rides, such as user expressions related to AV rides. The user datastore 640 may also store data indicating user interests associated with rides provided by AVs. The fleet management system 120 may include one or more learning modules (not shown in FIG. 6) to learn user interests based on user data. For example, a learning module may compare locations in the user datastore 640 with map datastore 650 to identify places the user has visited or plans to visit. For example, the learning module may compare an origin or destination address for a user in the user datastore 640 to an entry in the map datastore 650 that describes a building at that address. The map datastore 650 may indicate a building type, e.g., to determine that the user was picked up or dropped off at an event center, a restaurant, or a movie theater. In some embodiments, the learning module may further compare a date of the ride to event data from another data source (e.g., a third-party event data source, or a third-party movie data source) to identify a more particular interest, e.g., to identify a performer who performed at the event center on the day that the user was picked up from an event center, or to identify a movie that started shortly after the user was dropped off at a movie theater. This interest (e.g., the performer or movie) may be added to the user datastore 640.

In some embodiments, a user 135 is associated with a user profile stored in the user datastore 640. A user profile may include declarative information about the user 135 that was explicitly shared by the user 135 and may also include profile information inferred by the fleet management system 120. In one embodiment, the user profile includes multiple data fields, each describing one or more attributes of the user 135. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, an image of a user 135 may be tagged with information identifying the user 135 displayed in the image.

The map datastore 650 stores a detailed map of environments through which the AVs may travel. The map datastore 650 includes data describing roadways, such as e.g., locations of roadways, connections between roadways, roadway names, speed limits, traffic flow regulations, toll information, etc. The map datastore 650 may further include data describing buildings (e.g., locations of buildings, building geometry, building types), and data describing other objects (e.g., location, geometry, object type) that may be in the environments of AV. The map datastore 650 may also include data describing other features, such as bike lanes, sidewalks, crosswalks, traffic lights, parking lots, signs, billboards, etc.

Some of the map datastore 650 may be gathered by the fleet of AVs. For example, images obtained by the exterior sensors 210 of the AVs may be used to learn information about the AVs' environments. As one example, AVs may capture images in a residential neighborhood during a Christmas season, and the images may be processed to identify which homes have Christmas decorations. The images may be processed to identify particular features in the environment. For the Christmas decoration example, such features may include light color, light design (e.g., lights on trees, roof icicles, etc.), types of blow-up figures, etc. The fleet management system 120 and/or AVs may have one or more image processing modules to identify features in the captured images or other sensor data. This feature data may be stored in the map datastore 650. In some embodiments, certain feature data (e.g., seasonal data, such as Christmas decorations, or other features that are expected to be temporary) may expire after a certain period of time. In some embodiments, data captured by a second AV may indicate that a previously-observed feature is no longer present (e.g., a blow-up Santa has been removed) and in response, the fleet management system 120 may remove this feature from the map datastore 650.

Example Method of Broadcasting Vehicle Capabilities

Figure 7:
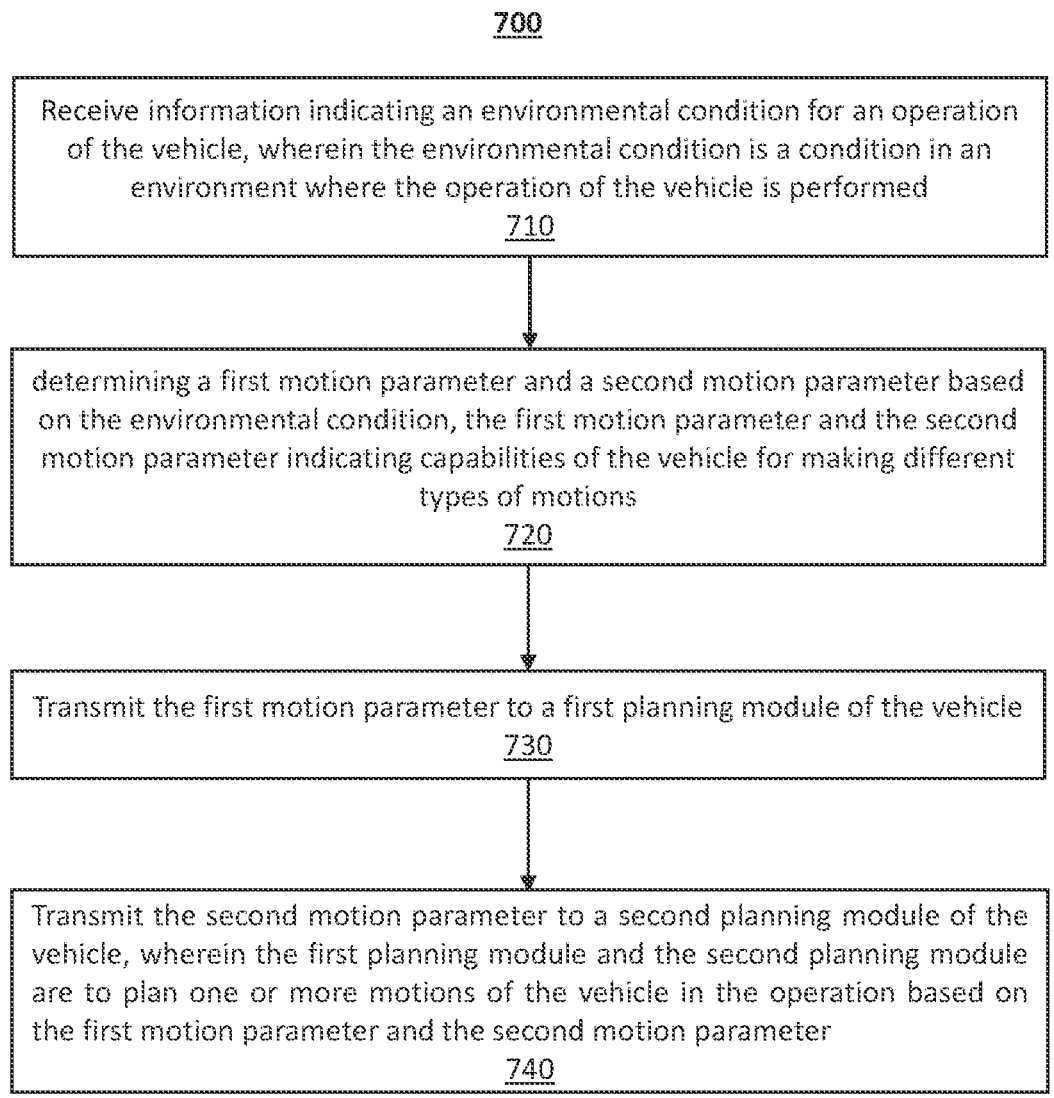
FIG. 7 is a flowchart showing a method of broadcasting vehicle capabilities to planning modules, according to some embodiments of the present disclosure.

FIG. 7 is a flowchart showing a method 700 of broadcasting vehicle capabilities to planning modules of a vehicle, according to some embodiments of the present disclosure. The method 700 may be performed by the vehicle capability broadcaster 420. Although the method 700 is described with reference to the flowchart illustrated in FIG. 7, many other methods of broadcasting vehicle capabilities to planning modules may alternatively be used. For example, the order of execution of the steps in FIG. 7 may be changed. As another example, some of the steps may be changed, eliminated, or combined.

The vehicle capability broadcaster 420 receives, in 710, information indicating an environmental condition for an operation of the vehicle. The environmental condition is a condition in an environment where the operation of the vehicle is performed. In some embodiments, the vehicle capability broadcaster 420 may receive the information from one or more sensors of the vehicle, one or more other vehicles in communication with the vehicle, a system in communication with the vehicle through a network, or some combination thereof.

The vehicle capability broadcaster 420 determines, in 720, a first vehicle capability parameter and a second vehicle capability parameter based on the environmental condition. The first vehicle capability parameter and the second vehicle capability parameter indicate capabilities of the vehicle for making different types of motions. In some embodiments, the environmental condition includes a weather condition of the environment. The vehicle capability broadcaster 420 may determine a friction factor based on the weather condition. The first vehicle capability parameter or the second vehicle capability parameter may be determined based on the friction factor.

The first vehicle capability parameter or the second vehicle capability parameter may specify a limit of the vehicle making a motion. The plan may include a motion parameter determined based on the first vehicle capability parameter or the second vehicle capability parameter. The motion parameter may have a value within the limit.

The vehicle capability broadcaster 420 transmits, in 730, the first vehicle capability parameter to a first planning module of the vehicle. The vehicle capability broadcaster 420 transmits, in 740, the second vehicle capability parameter to a second planning module of the vehicle. The first planning module and the second planning module are to plan one or more motions of the vehicle in the operation based on the first vehicle capability parameter and the second vehicle capability parameter. The first planning module may be to generate a first plan for the operation based on the first vehicle capability parameter. The second planning module may be to generate a second plan for the operation based on at least part of the first plan and the second vehicle capability parameter.

In some embodiments, the first planning module is to update the first plan at a first frequency. The second planning module is to update the second plan at a second frequency. The first frequency is lower than the second frequency.

In some embodiments, the vehicle capability broadcaster 420 provides a query interface to the first planning module or the second planning module. The vehicle capability broadcaster 420 may receive a query from the first planning module or the second planning module through the query interface. The vehicle capability broadcaster 420 may transmit the first vehicle capability parameter or the second vehicle capability parameter through the query interface in response to receiving the query.

In some embodiments, the vehicle capability broadcaster 420 receives new information indicating a new environmental condition. The vehicle capability broadcaster 420 generates a new motion parameter by adjusting the first vehicle capability parameter or the second vehicle capability parameter based on the new environmental condition.

The vehicle capability broadcaster 420 may transmit the new motion parameter to the first planning module or the second planning module after the first planning module and the second planning module have planned the one or more motions of the vehicle in the operation based on the first vehicle capability parameter and the second vehicle capability parameter. In some embodiments, the vehicle capability broadcaster 420 may generate the new motion parameter before the first planning module and the second planning module plan the one or more motions of the vehicle in the operation based on the first vehicle capability parameter and the second vehicle capability parameter.

Select Examples

Example 1 provides a method, including receiving information indicating an environmental condition for an operation of a vehicle, where the environmental condition is a condition in an environment where the operation of the vehicle is performed; determining a first motion limit and a second motion limit based on the environmental condition, the first motion limit and the second motion limit indicating capabilities of the vehicle for different types of motions; transmitting the first motion limit to a first planning module in response to a first query received from the first planning module; and transmitting the second motion limit to a second planning module in response to a second query received from the second planning module, where the first planning module and the second planning module are to use the first motion limit and the second motion limit, respectively, to plan for motions of the vehicle in the operation.

Example 2 provides the method of example 1, further including providing a query interface to the first planning module or the second planning module; and receiving a query from the first planning module or the second planning module through the query interface, where transmitting the first vehicle capability parameter or the second vehicle capability parameter includes transmitting the first vehicle capability parameter or the second vehicle capability parameter through the query interface in response to receiving the query.

Example 3 provides the method of example 1, further including receiving new information indicating a new environmental condition; and generating a new motion parameter by adjusting the first vehicle capability parameter or the second vehicle capability parameter based on the new environmental condition.

Example 4 provides the method of example 3, further including transmitting the new motion parameter to the first planning module or the second planning module after the first planning module and the second planning module have planned the one or more motions of the vehicle in the operation based on the first vehicle capability parameter and the second vehicle capability parameter.

Example 5 provides the method of example 4, where generating a new motion parameter includes generating the new motion parameter is generated before the first planning module and the second planning module plan the one or more motions of the vehicle in the operation based on the first vehicle capability parameter and the second vehicle capability parameter.

Example 6 provides the method of example 1, where the first planning module is to generate a first plan for the operation based on the first vehicle capability parameter, and the second planning module is to generate a second plan for the operation based on at least part of the first plan and the second vehicle capability parameter.

Example 7 provides the method of example 6, where the first planning module is to update the first plan at a first frequency, the second planning module is to update the second plan at a second frequency, and the first frequency is lower than the second frequency.

Example 8 provides the method of example 1, where the environmental condition includes a weather condition of the environment, the method further includes determining a friction factor based on the weather condition, and the first vehicle capability parameter or the second vehicle capability parameter is determined based on the friction factor.

Example 9 provides the method of example 1, where receiving the information includes receiving the information from one or more sensors of the vehicle, one or more other vehicles in communication with the vehicle, a system in communication with the vehicle through a network, or some combination thereof.

Example 10 provides the method of example 1, where the first vehicle capability parameter or the second vehicle capability parameter specifies a limit of the vehicle making a motion, the plan includes a motion parameter determined based on the first vehicle capability parameter or the second vehicle capability parameter, and the motion parameter has a value within the limit.

Example 11 provides one or more non-transitory computer-readable media storing instructions executable to perform operations, the operations including receiving information indicating an environmental condition for an operation of a vehicle, where the environmental condition is a condition in an environment where the operation of the vehicle is performed; determining a first vehicle capability parameter and a second vehicle capability parameter based on the environmental condition, the first vehicle capability parameter and the second vehicle capability parameter indicating capabilities of the vehicle for making different types of motions; transmitting the first vehicle capability parameter to a first planning module of the vehicle; and transmitting the second vehicle capability parameter to a second planning module of the vehicle, where the first planning module and the second planning module are to plan one or more motions of the vehicle in the operation based on the first vehicle capability parameter and the second vehicle capability parameter.

Example 12 provides the one or more non-transitory computer-readable media of example 11, where the operations further include providing a query interface to the first planning module or the second planning module; and receiving a query from the first planning module or the second planning module through the query interface, where transmitting the first vehicle capability parameter or the second vehicle capability parameter includes transmitting the first vehicle capability parameter or the second vehicle capability parameter through the query interface in response to receiving the query.

Example 13 provides the one or more non-transitory computer-readable media of example 12, where the operations further include receiving new information indicating a new environmental condition; and generating a new motion parameter by adjusting the first vehicle capability parameter or the second vehicle capability parameter based on the new environmental condition.

Example 14 provides the one or more non-transitory computer-readable media of example 13, where the operations further include transmitting the new motion parameter to the first planning module or the second planning module after the first planning module and the second planning module have planned the one or more motions of the vehicle in the operation based on the first vehicle capability parameter and the second vehicle capability parameter.

Example 15 provides the one or more non-transitory computer-readable media of example 14, where generating a new motion parameter includes generating the new motion parameter is generated before the first planning module and the second planning module plan the one or more motions of the vehicle in the operation based on the first vehicle capability parameter and the second vehicle capability parameter.

Example 16 provides the one or more non-transitory computer-readable media of example 11, where the first planning module is to generate a first plan for the operation based on the first vehicle capability parameter, and the second planning module is to generate a second plan for the operation based on at least part of the first plan and the second vehicle capability parameter.

Example 17 provides the one or more non-transitory computer-readable media of example 11, where receiving the information includes receiving the information from one or more sensors of the vehicle, one or more other vehicles in communication with the vehicle, a system in communication with the vehicle through a network, or some combination thereof.

Example 18 provides a computer system, including a computer processor for executing computer program instructions; and one or more non-transitory computer-readable media storing computer program instructions executable by the computer processor to perform operations including receiving information indicating an environmental condition for an operation of a vehicle, where the environmental condition is a condition in an environment where the operation of the vehicle is performed, determining a first vehicle capability parameter and a second vehicle capability parameter based on the environmental condition, the first vehicle capability parameter and the second vehicle capability parameter indicating capabilities of the vehicle for making different types of motions, transmitting the first vehicle capability parameter to a first planning module of the vehicle, and transmitting the second vehicle capability parameter to a second planning module of the vehicle, where the first planning module and the second planning module are to plan one or more motions of the vehicle in the operation based on the first vehicle capability parameter and the second vehicle capability parameter.

Example 19 provides the computer system of example 18, where the operations further include providing a query interface to the first planning module or the second planning module; and receiving a query from the first planning module or the second planning module through the query interface, where transmitting the first vehicle capability parameter or the second vehicle capability parameter includes transmitting the first vehicle capability parameter or the second vehicle capability parameter through the query interface in response to receiving the query.

Example 20 provides the computer system of example 18, where the operations further include receiving new information indicating a new environmental condition; generating a new motion parameter by adjusting the first vehicle capability parameter or the second vehicle capability parameter based on the new environmental condition; and transmitting the new motion parameter to the first planning module or the second planning module after the first planning module and the second planning module have planned the one or more motions of the vehicle in the operation based on the first vehicle capability parameter and the second vehicle capability parameter.

OTHER IMPLEMENTATION NOTES, VARIATIONS, AND APPLICATIONS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the figures may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

What is claimed is:

1. A method, comprising:
  receiving information indicating an environmental condition for an operation of a vehicle, wherein the environmental condition is a condition in an environment where the operation of the vehicle is performed;
  determining a first vehicle capability parameter and a second vehicle capability parameter based on the environmental condition, the first vehicle capability parameter and the second vehicle capability parameter indicating capabilities of the vehicle for making different types of motions;
  transmitting the first vehicle capability parameter to a first planning module of the vehicle; and
  transmitting the second vehicle capability parameter to a second planning module of the vehicle,
  wherein the first planning module and the second planning module are to plan one or more motions of the vehicle in the operation based on the first vehicle capability parameter and the second vehicle capability parameter.

2. The method of claim 1, further comprising:
providing a query interface to the first planning module or the second planning module; and
receiving a query from the first planning module or the second planning module through the query interface,
wherein transmitting the first vehicle capability parameter or the second vehicle capability parameter comprises transmitting the first vehicle capability parameter or the second vehicle capability parameter through the query interface in response to receiving the query.

3. The method of claim 1, further comprising:
receiving new information indicating a new environmental condition; and
generating a new motion parameter by adjusting the first vehicle capability parameter or the second vehicle capability parameter based on the new environmental condition.

4. The method of claim 3, further comprising:
transmitting the new motion parameter to the first planning module or the second planning module after the first planning module and the second planning module have planned the one or more motions of the vehicle in the operation based on the first vehicle capability parameter and the second vehicle capability parameter.

5. The method of claim 4, wherein generating the new motion parameter comprises:
generating the new motion parameter is generated before the first planning module and the second planning module plan the one or more motions of the vehicle in the operation based on the first vehicle capability parameter and the second vehicle capability parameter.

6. The method of claim 1, wherein the first planning module is to generate a first plan for the operation based on the first vehicle capability parameter, and the second planning module is to generate a second plan for the operation based on at least part of the first plan and the second vehicle capability parameter.

7. The method of claim 6, wherein the first planning module is to update the first plan at a first frequency, the second planning module is to update the second plan at a second frequency, and the first frequency is lower than the second frequency.

8. The method of claim 1, wherein the environmental condition includes a weather condition of the environment, the method further comprises determining a friction factor based on the weather condition, and the first vehicle capability parameter or the second vehicle capability parameter is determined based on the friction factor.

9. The method of claim 1, wherein receiving the information comprises:
receiving the information from one or more sensors of the vehicle, one or more other vehicles in communication with the vehicle, a system in communication with the vehicle through a network, or some combination thereof.

10. The method of claim 1, wherein the first vehicle capability parameter or the second vehicle capability parameter specifies a limit of the vehicle making a motion, the plan includes a motion parameter determined based on the first vehicle capability parameter or the second vehicle capability parameter, and the motion parameter has a value within the limit.

11. One or more non-transitory computer-readable media storing instructions executable to perform operations, the operations comprising:
receiving information indicating an environmental condition for an operation of a vehicle, wherein the environmental condition is a condition in an environment where the operation of the vehicle is performed;
determining a first vehicle capability parameter and a second vehicle capability parameter based on the environmental condition, the first vehicle capability parameter and the second vehicle capability parameter indicating capabilities of the vehicle for making different types of motions;
transmitting the first vehicle capability parameter to a first planning module of the vehicle; and
transmitting the second vehicle capability parameter to a second planning module of the vehicle, wherein the first planning module and the second planning module are to plan one or more motions of the vehicle in the operation based on the first vehicle capability parameter and the second vehicle capability parameter.

12. The one or more non-transitory computer-readable media of claim 11, wherein the operations further comprise:
providing a query interface to the first planning module or the second planning module; and
receiving a query from the first planning module or the second planning module through the query interface,
wherein transmitting the first vehicle capability parameter or the second vehicle capability parameter comprises transmitting the first vehicle capability parameter or the second vehicle capability parameter through the query interface in response to receiving the query.

13. The one or more non-transitory computer-readable media of claim 12, wherein the operations further comprise:
receiving new information indicating a new environmental condition; and
generating a new motion parameter by adjusting the first vehicle capability parameter or the second vehicle capability parameter based on the new environmental condition.

14. The one or more non-transitory computer-readable media of claim 13, wherein the operations further comprise:
transmitting the new motion parameter to the first planning module or the second planning module after the first planning module and the second planning module have planned the one or more motions of the vehicle in the operation based on the first vehicle capability parameter and the second vehicle capability parameter.

15. The one or more non-transitory computer-readable media of claim 14, wherein generating the new motion parameter comprises:
generating the new motion parameter is generated before the first planning module and the second planning module plan the one or more motions of the vehicle in the operation based on the first vehicle capability parameter and the second vehicle capability parameter.

16. The one or more non-transitory computer-readable media of claim 11, wherein the first planning module is to generate a first plan for the operation based on the first vehicle capability parameter, and the second planning module is to generate a second plan for the operation based on at least part of the first plan and the second vehicle capability parameter.

17. The one or more non-transitory computer-readable media of claim 11, wherein receiving the information comprises:

receiving the information from one or more sensors of the vehicle, one or more other vehicles in communication with the vehicle, a system in communication with the vehicle through a network, or some combination thereof.

18. A computer system, comprising:
a computer processor for executing computer program instructions; and
one or more non-transitory computer-readable media storing computer program instructions executable by the computer processor to perform operations comprising:
receiving information indicating an environmental condition for an operation of a vehicle, wherein the environmental condition is a condition in an environment where the operation of the vehicle is performed,
determining a first vehicle capability parameter and a second vehicle capability parameter based on the environmental condition, the first vehicle capability parameter and the second vehicle capability parameter indicating capabilities of the vehicle for making different types of motions,
transmitting the first vehicle capability parameter to a first planning module of the vehicle, and
transmitting the second vehicle capability parameter to a second planning module of the vehicle,
wherein the first planning module and the second planning module are to plan one or more motions of the vehicle in the operation based on the first vehicle capability parameter and the second vehicle capability parameter.

19. The computer system of claim 18, wherein the operations further comprise:
providing a query interface to the first planning module or the second planning module; and
receiving a query from the first planning module or the second planning module through the query interface,
wherein transmitting the first vehicle capability parameter or the second vehicle capability parameter comprises transmitting the first vehicle capability parameter or the second vehicle capability parameter through the query interface in response to receiving the query.

20. The computer system of claim 18, wherein the operations further comprise:
receiving new information indicating a new environmental condition;
generating a new motion parameter by adjusting the first vehicle capability parameter or the second vehicle capability parameter based on the new environmental condition; and
transmitting the new motion parameter to the first planning module or the second planning module after the first planning module and the second planning module have planned the one or more motions of the vehicle in the operation based on the first vehicle capability parameter and the second vehicle capability parameter.

* * * * *